US008923685B2

(12) United States Patent
Roberts et al.

(10) Patent No.: US 8,923,685 B2
(45) Date of Patent: Dec. 30, 2014

(54) METHODS AND SYSTEMS FOR DYNAMICALLY BALANCING STORAGE OF RECORDED MEDIA CONTENT DATA BETWEEN A LOCAL STORAGE DEVICE AND A NETWORK STORAGE DEVICE

(75) Inventors: Brian F. Roberts, Dallas, TX (US); Harpal S. Bassali, San Francisco, CA (US); Sudhanshu Sharma, Coppell, TX (US); Donald H. Relyea, Dallas, TX (US); Raul I. Aldrey, Plano, TX (US); Japan A. Mehta, Coppell, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 757 days.

(21) Appl. No.: 12/790,473

(22) Filed: May 28, 2010

(65) Prior Publication Data
US 2011/0293251 A1 Dec. 1, 2011

(51) Int. Cl.
*H04N 5/76* (2006.01)
*H04N 21/231* (2011.01)
*H04N 21/2747* (2011.01)
*H04N 21/433* (2011.01)
*H04N 21/4335* (2011.01)

(52) U.S. Cl.
CPC ..... *H04N 21/23103* (2013.01); *H04N 21/2747* (2013.01); *H04N 21/4334* (2013.01); *H04N 21/4335* (2013.01)

USPC .......................................... 386/296; 386/295

(58) Field of Classification Search
USPC ................................. 386/293–296
See application file for complete search history.

(56) References Cited

U.S. PATENT DOCUMENTS

| | | | |
|---|---|---|---|
| 2002/0174430 A1* | 11/2002 | Ellis et al. | 725/46 |
| 2004/0237104 A1* | 11/2004 | Cooper et al. | 725/38 |
| 2004/0244030 A1* | 12/2004 | Boyce et al. | 725/25 |
| 2005/0050578 A1* | 3/2005 | Ryal | 725/143 |
| 2005/0204386 A1* | 9/2005 | Ismail et al. | 725/46 |
| 2007/0250863 A1 | 10/2007 | Ferguson | |
| 2009/0210533 A1* | 8/2009 | Verhaegh et al. | 709/226 |
| 2010/0005483 A1 | 1/2010 | Rao | |
| 2010/0058381 A1 | 3/2010 | Begeja et al. | |

FOREIGN PATENT DOCUMENTS

WO 2009/110909 9/2009

* cited by examiner

*Primary Examiner* — Nigar Chowdhury

(57) ABSTRACT

An exemplary method includes receiving a command input by a user to record media content, recording media content data representative of the media content in response to the command, automatically selecting at least one storage device from a local storage device and a network storage device for storage of the recorded media content data in accordance with at least one of a plurality of storage balancing factors, and storing the recorded media content data in the at least one selected storage device. Corresponding methods and systems are also disclosed.

21 Claims, 8 Drawing Sheets

US 8,923,685 B2

METHODS AND SYSTEMS FOR DYNAMICALLY BALANCING STORAGE OF RECORDED MEDIA CONTENT DATA BETWEEN A LOCAL STORAGE DEVICE AND A NETWORK STORAGE DEVICE

BACKGROUND INFORMATION

The set-top box device has become an important device for accessing media content services and the media content within those services. It is not uncommon for a set-top box device to include or to be used in conjunction with digital video recording ("DVR") technology, which may be used to record media content to permanent storage (e.g., a hard drive included within the set-top box device) for subsequent local access.

A common frustration among set-top box device users is that a hard drive included within a set-top box device may run out of available storage space after a certain amount of recorded media content data is stored therein. When this happens, a user typically has to manually delete some of the recorded media content from the hard drive of the set-top box device in order to record additional media content. Manual deletion of recorded media content is often cumbersome, time consuming, and potentially risky. For example, the user may accidentally delete recorded media content that another user (e.g., a family member) still desires to access. Hence, it would be ideal for a set-top box user to never have to worry about whether enough storage space exists within a set-top box hard drive.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
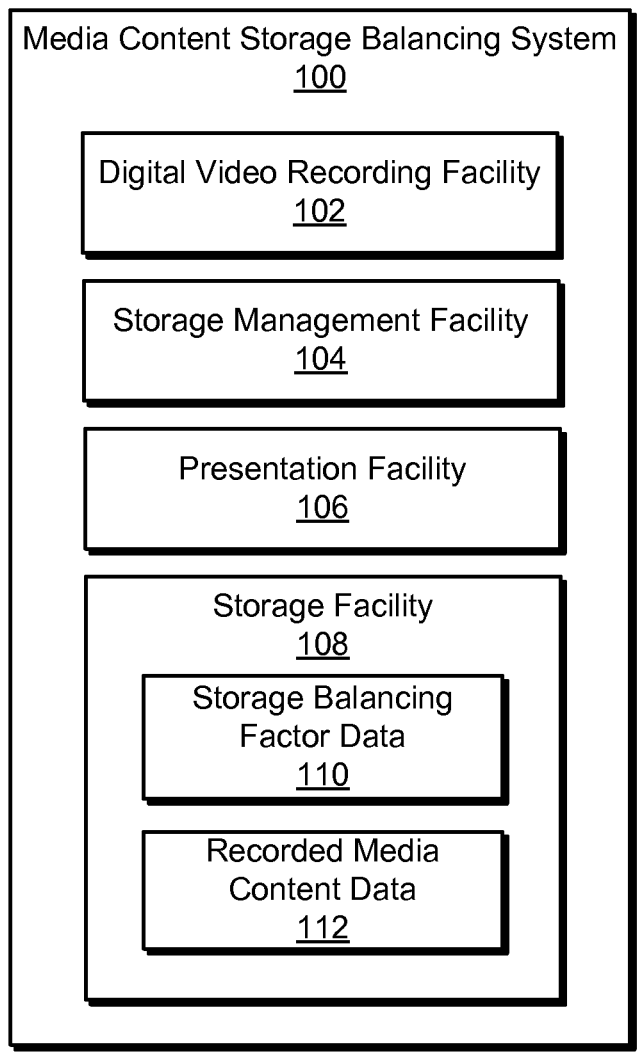
FIG. 1 illustrates an exemplary media content storage balancing system according to principles described herein.

Methods and systems for dynamically balancing storage of recorded media content data between a local storage device and a network storage device are described herein. As described in more detail below, a media content storage balancing system may be configured to receive a command input by a user to record media content, record media content data representative of the media content in response to the command, automatically select at least one storage device from a local storage device and a network storage device for storage of the recorded media content data in accordance with at least one of a plurality of storage balancing factors, and store the recorded media content data in the at least one selected storage device. After the recorded media content data has been initially stored, the media content storage balancing system may dynamically shift at least a portion of the recorded media content data between the local storage device and the network storage device in accordance with at least one of the plurality of storage balancing factors.

As described in more detail below, the methods and systems described herein may facilitate automatic and dynamic management of where recorded media content data is stored. Such storage management may be performed in a manner that is transparent to a user so that the user does not have to worry about where recorded media content data is stored or whether there is enough storage space within a local storage device (e.g., a hard drive) associated with a media content access device (e.g., a set-top box device) to store media content data representative of a desired media content instance.

As used herein, the term "media content" may refer generally to any content made accessible by a media content delivery subsystem to a media content access subsystem. The term "media content instance" as used herein may refer generally to any television program, on-demand media program, pay-per-view media program, broadcast media program (e.g., broadcast television program), multicast media program, narrowcast media program, IPTV content, advertisement (e.g., commercial), video, movie, song, or any segment, component, or combination of these or other forms of media content that may be viewed or otherwise experienced by a user.

As used herein, a "storage balancing factor" refers to any factor that may be used to dynamically balance storage of recorded media content data between a local storage device and a network storage device. Exemplary storage balancing factors include, but are not limited to, an interaction profile associated with a user, a user profile associated with the user, a demand rating of recorded media content represented by the recorded media content data, a demand curve associated with the recorded media content, a replay value of the recorded media content, a storage capacity of the local storage device and/or the network storage device, a hardware profile of a media content access device associated with the local storage device, a characteristic of the recorded media content, a business rule associated with the recorded media content, a time of day, and a network activity level.

FIG. 1 illustrates an exemplary media content storage balancing system 100 (or simply "system 100"). As will be described in more detail below, system 100 may be configured to facilitate dynamic and automatic balancing of storage of recorded media content between one or more local storage devices (e.g., one or more hard drives) associated with a media content access device (e.g., a set-top box device) and one or more network storage devices (e.g., one or more hard drives included within a network server or the like). System 100 may include, but is not limited to, a digital video recording ("DVR") facility 102, a storage management facility 104, a presentation facility 106, and a storage facility 108. Each of these facilities will now be described in more detail.

DVR facility 102 may be configured to facilitate temporary and/or permanent recording of selected media content to storage facility 108. For example, DVR facility 102 may be configured to receive a command input by a user to record media content and record media content data representative of the media content in response to the command. In some examples, DVR facility 102 may be configured to automatically record media content in accordance with a recording schedule created by the user and/or in accordance with any other factor as may serve a particular implementation.

DVR facility 102 may be further configured to facilitate "trick play," or non-linear, modes. For example, DVR facility 102 may be configured to receive and execute one or more commands input by a user that are configured to pause a presentation of a media content instance, resume a presentation of a media content instance, skip to a different position within a media content instance, fast forward within a media content instance, and/or rewind within a media content instance.

Storage management facility 104 may be configured to dynamically manage a storage location of recorded media content data as recorded by DVR facility 102. For example, storage management facility 104 may be configured to automatically select at least one storage device from a local storage device and a network storage device for initial storage of the recorded media content data in accordance with at least one of a plurality of storage balancing factors. Exemplary storage balancing factors and how they may affect the automatic selection performed by storage management facility 104 will be described in more detail below.

After the recorded media content data has been initially stored, storage management facility 104 may dynamically shift at least a portion of the recorded media content data between the local storage device and the network storage device in accordance with at least one of the plurality of storage balancing factors. Exemplary storage balancing factors and how they may affect the dynamic shifting performed by storage management facility 104 will be described in more detail below.

Presentation facility 106 may be configured to control a presentation of media content (e.g., live media content and/or recorded media content) to a user. For example, presentation facility 106 may be configured to display or otherwise present one or more media content instances and/or one or more options associated with a media content instance (e.g., one or more program guide graphical user interfaces ("GUIs"), one or more recording and/or storage options associated with a media content instance, etc.).

Storage facility 108 may be configured to maintain storage balancing factor data 110 representative of one or more storage balancing factors and recorded media content data 112 representative of media content recorded by DVR facility 102. It will be recognized that storage facility 108 may maintain additional or alternative data as may serve a particular implementation.

In some examples, as will be described in more detail below, storage facility 108 may be implemented by one or more local storage devices and/or one or more network storage devices. Each of the one or more local storage devices (e.g., a hard drive, a USB drive, and/or an eSATA drive) may be included within or directly connected to a media content access device (e.g., a set-top box device). Each of the one or more network storage devices may be communicatively coupled to the media content access device by way of one or more networks (e.g., local area networks ("LANs") and/or wide area networks ("WANs")). For example, a network storage device may be associated with (e.g., included within) a personal computer connected to the same local area network as the media content access device and/or associated with a remote server communicatively connected to the media content access device by way of the Internet.

Figure 2:
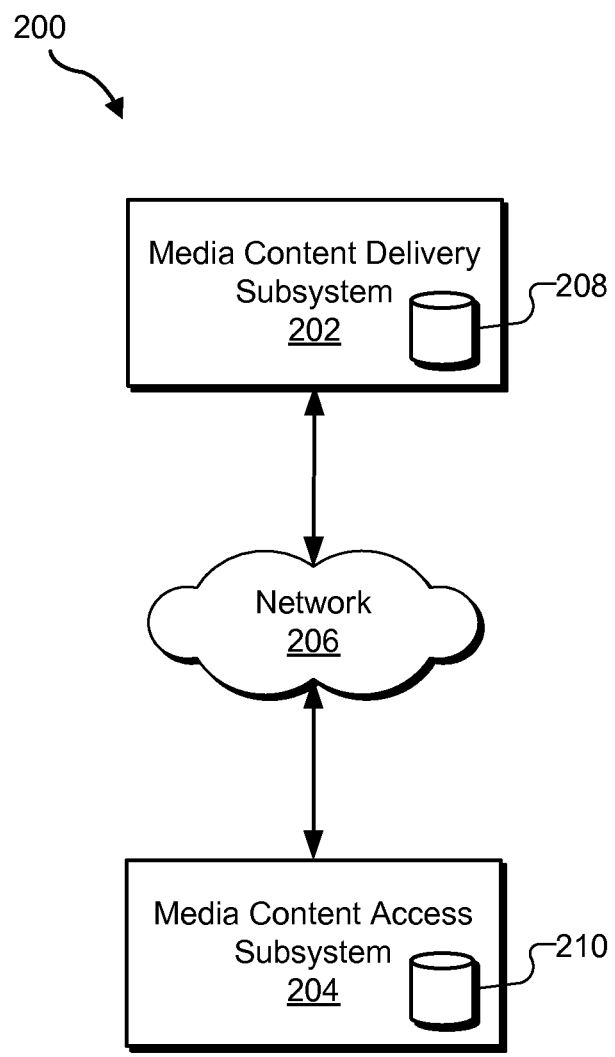
FIG. 2 illustrates an exemplary implementation of the system of FIG. 1 according to principles described herein.

FIG. 2 illustrates an exemplary implementation 200 of system 100 in which a media content delivery subsystem 202 (or simply "delivery subsystem 202") is communicatively coupled to a media content access subsystem 204 (or simply "access subsystem 204"). Any of the facilities 102-108 may be implemented on one or both of delivery subsystem 202 and access subsystem 204.

Access subsystem 204 may be configured to communicate with and receive a signal and/or data stream containing data representative of media content and/or data associated with media content (e.g., metadata, program guide data, etc.) from delivery subsystem 202. Access subsystem 204 and delivery subsystem 202 may communicate using any suitable communication technologies, devices, networks, media, and protocols supportive of remote data communications.

For example, as shown in FIG. 2, delivery subsystem 202 may be configured to communicate with access subsystem 204 over a network 206 (and communications links thereto). Network 206 may include one or more networks or types of networks capable of carrying communications and/or data signals between delivery subsystem 202 and access subsystem 204. For example, network 206 may include, but is not limited to, a cable network, optical fiber network, hybrid fiber coax network, wireless network (e.g., a Wi-Fi and/or mobile telephone network), satellite network, wireless broadcast network (e.g., a satellite media broadcasting network or terrestrial broadcasting network), subscriber television network, a provider-specific network (e.g., a Verizon® FIOS® network), the Internet, an intranet, local area network, any other suitable network, and any combination or sub-combination of these networks.

Delivery subsystem 202 and access subsystem 204 may communicate over network 206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

In some examples, delivery subsystem 202 may be configured to generate or otherwise provide media content to access subsystem 204. Access subsystem 204 may be configured to facilitate access by a user to media content received from delivery subsystem 202. To this end, access subsystem 204 may present the media content for experiencing (e.g., viewing) by a user, record the media content, and/or perform any other operation associated with the media content as may serve a particular implementation.

As shown in FIG. 2, a network storage device 208 may be associated with (e.g., included within) delivery subsystem 202, and a local storage device 210 may be associated with (e.g., included within) access subsystem 204. Network storage device 208 and local storage device 210 may each include one or more persistent storage mediums (e.g., one or more hard drives, flash drives, USB drives, eSATA drives, etc.).

In some examples, network storage device 208 may be owned, maintained, and/or otherwise managed by a service provider (e.g., a subscription television service provider). While network storage device 208 is shown to be included within delivery subsystem 202, it will be recognized that network storage device 208 may alternatively be separate from delivery subsystem 202. For example, network storage device 208 may be owned, maintained, and/or otherwise managed by a third party entity separate from delivery subsystem 202.

Figure 3:
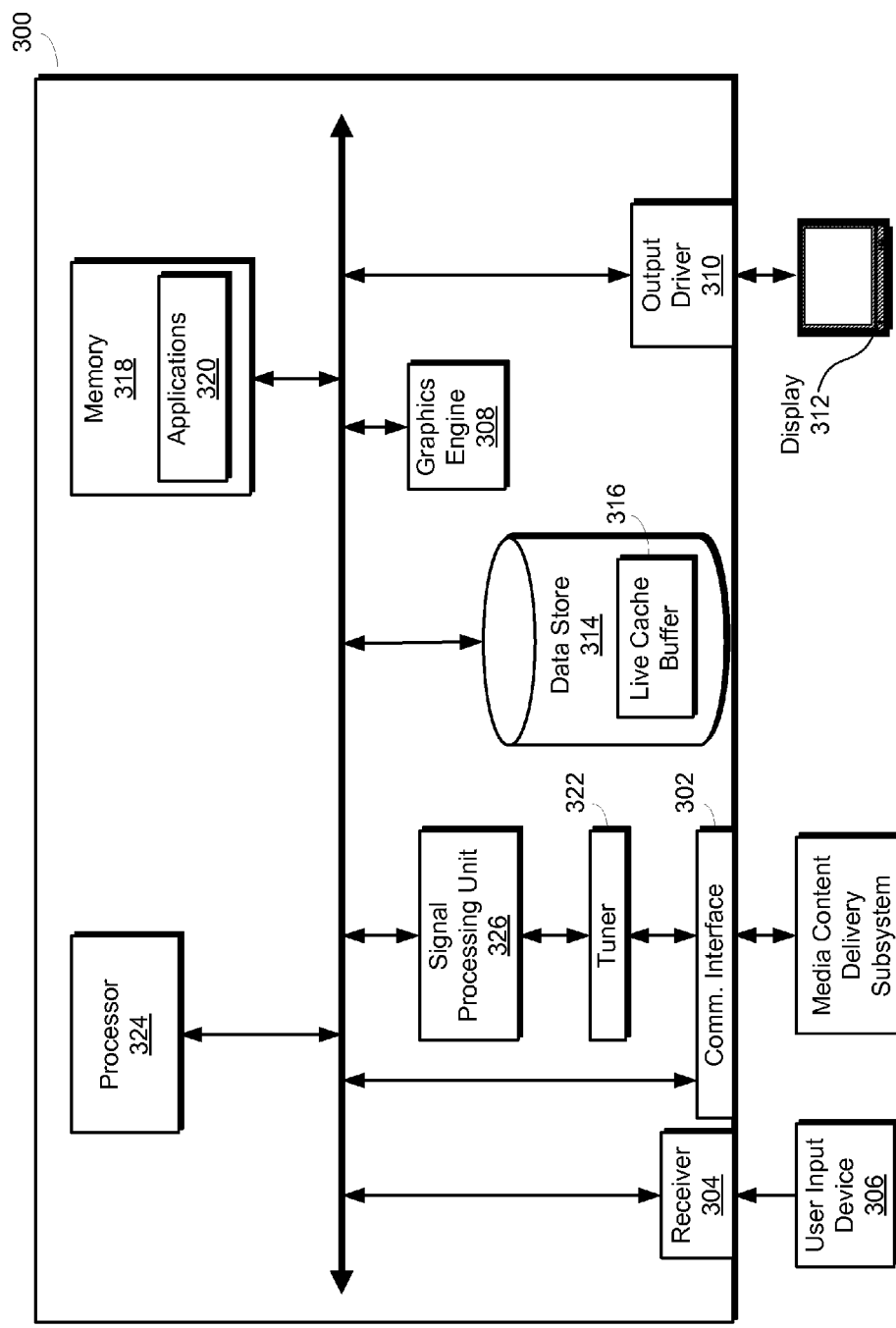
FIG. 3 illustrates an exemplary media content access device according to principles described herein.

Access subsystem 104 and/or components of access subsystem 104 may be implemented as may suit a particular implementation. FIG. 3 illustrates an exemplary media content access device 300 (or simply "device 300") having access subsystem 104 implemented thereon. Device 300 may include one or more of the components of access subsystem 104 shown in FIG. 3 and may be configured to perform one or more of the processes and/or operations described herein. Device 300 may include, but is not limited to, a set-top box device, a DVR device, a multi-room DVR device, a media content processing device, a communications device, a mobile device (e.g., a mobile phone device), a handheld device, a personal computer, a phone device, a personal-digital assistant device, a gaming device, a television device, and/or any device configured to perform one or more of the processes and/or operations described herein.

As shown in FIG. 3, device 300 may include a communication interface 302 configured to receive media content and/or data (e.g., storage balancing factor data, data representative of recording options, program guide data, and/or any other data associated with media content) in any acceptable format from delivery subsystem 202 or from any other suitable external source. Communication interface 302 may include any device, logic, and/or other technologies suitable for receiving signals and/or data representative of media content and/or other types of media content or data. Communication interface 302 may be configured to interface with any suitable communication media, protocols, and formats, including any of those mentioned above.

Device 300 may include a receiver 304 configured to receive user input signals from a user input device 306. User input device 306 may include, for example, a remote control device or any other suitable input device and may be configured to communicate with receiver 304 via a wireless link, electrical connection, or any other suitable communication link.

Device 300 may include a graphics engine 308 and an output driver 310. Graphics engine 308 may be configured to generate graphics to be provided to output driver 310, which may be configured to interface with or drive a display 312. Output driver 310 may provide output signals to display 312, the output signals including graphical media content (e.g., media content and/or program guide media content) generated by graphics engine 308 and to be presented by display 312 for experiencing by a user. For example, output driver 310 may provide data representative of a graphical user interface including a program guide view or a media playback view to display 312 for presentation to the user.

Data store 314 may implement local storage device 210 and may include one or more data storage media, devices, or configurations and may employ any type, form, and combination of storage media. For example, data store 314 may include, but is not limited to, a hard drive, network drive, flash drive, magnetic disc, optical disc, or other non-volatile storage unit. Media content and/or data associated with media content may be temporarily and/or permanently stored in data store 314.

Data store 314 is shown to be included within device 300 in FIG. 3 for illustrative purposes only. It will be understood that data store 314 may additionally or alternatively be located external to device 300.

Data store 314 may include one or more live cache buffers 316. Live cache buffer 316 may additionally or alternatively reside in memory 318 or in a storage device external to device 300. In some examples, media content data may be temporarily stored in live cache buffer 316 to facilitate recording of media content and/or presentation of media content in one or more trick play modes.

Device 300 may include memory 318. Memory 318 may include, but is not limited to, FLASH memory, random access memory ("RAM"), dynamic RAM ("DRAM"), other suitable computer-readable media, or any combination or subcombination thereof. In some examples, one or more applications 320 configured to run on or otherwise be executed by device 300 may reside in memory 318.

Device 300 may include one or more tuners 322. Tuner 322 may be configured to selectively receive media content carried on a particular content carrier such that the media content may be processed by device 300. In some examples, media content received by tuner 322 may be temporarily buffered, or stored, in the live cache buffer 316. If there are multiple tuners 322, there may be a live cache buffer 316 corresponding to each of the tuners 322.

While tuner 322 may be used to receive certain media content-carrying signals transmitted by delivery subsystem 202, device 300 may be configured to receive other types of media content signals (including media content signals and/or program guide data signals) from delivery subsystem 202 and/or one or more other sources without using a tuner. For example, delivery subsystem 202 may transmit digital streams of data packets (e.g., Internet Protocol ("IP") based data packets) that can be received without using a tuner. For such types of media content signals, communication interface 302 may receive and forward the signals directly to other components of device 300 (e.g., processor 324 or signal processing unit 326) without the signals going through tuner 322. For an IP-based signal, for example, signal processing unit 326 may function as an IP receiver.

Device 300 may include at least one processor, such as processor 324, configured to control and/or perform one or more operations of device 300. Device 300 may also include a signal processing unit 326 configured to process incoming media content. Signal processing unit 326 may be configured, for example, to demodulate and parse encoded digital media content. In some examples, device 300 may include one or more signal processing units 326 corresponding to each of the tuners 322.

Figure 4:
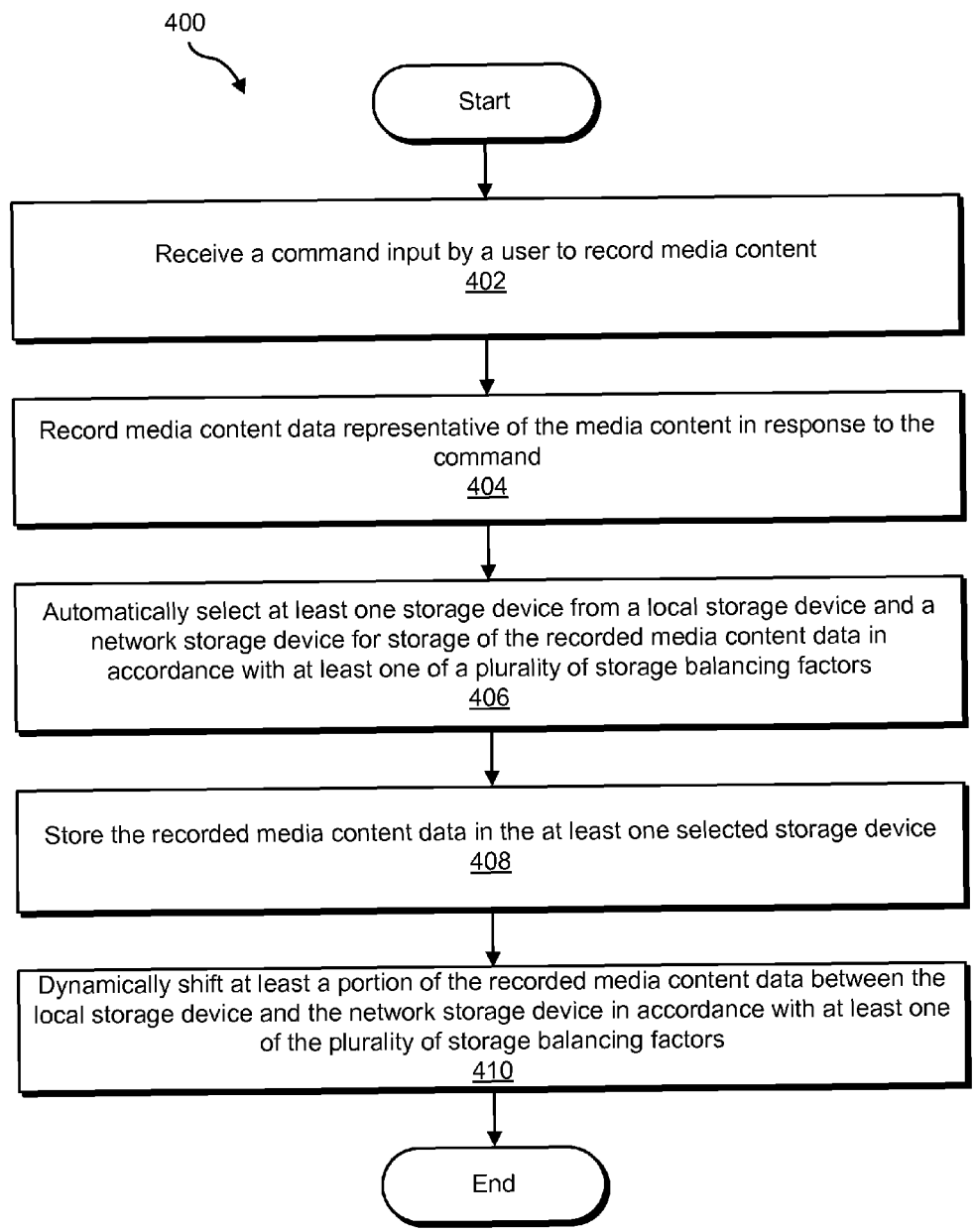
FIG. 4 illustrates an exemplary method of dynamically balancing storage of recorded media content data between a local storage device and a network storage device according to principles described herein.

FIG. 4 illustrates an exemplary method 400 of dynamically balancing storage of recorded media content data between a local storage device and a network storage device. While FIG. 4 illustrates exemplary steps according to one embodiment, other embodiments may omit, add to, reorder, and/or modify any of the steps shown in FIG. 4. The steps shown in FIG. 4 may be performed by any component or combination of components of system 100.

In step 402, a command input by a user to record media content is received. The command may be input and received in any suitable manner as may serve a particular implementation. For example, the user may utilize a graphical user interface provided by DVR facility 102 to schedule a recording of the media content.

In step 404, media content data representative of the media content is recorded in response to a command input in step 402. The media content data may be recorded in any suitable manner as may serve a particular implementation.

In step 406, at least one storage device is automatically selected from a local storage device and a network storage device for storage of the recorded media content data in accordance with at least one of a plurality of storage balancing factors. The automatic selection of the at least one storage device may be performed in any of the ways described herein.

Examples of the automatic selection performed in step 406 will be described in more detail below.

In step 408, the recorded media content data is initially stored in the at least one selected storage device. The recorded media content data may be stored in any suitable manner as may serve a particular implementation.

In step 410, after the recorded media content data is initially stored in the at least one selected storage device, at least a portion of the recorded media content data may be dynamically shifted between the local storage device and the network storage device in accordance with at least one of the plurality of storage balancing factors. The dynamic shifting of the recorded media content data between the local storage device and the network storage device may be performed in any suitable manner as may serve a particular implementation. Examples of the dynamic shifting performed in step 410 will be described in more detail below.

Various examples of how system 100 may utilize one or more storage balancing factors to dynamically balance storage of recorded media content data between a local storage device and a network storage device will now be described. It will be recognized that the examples given herein are merely illustrative of the many different ways in which system 100 may utilize storage balancing factors to dynamically balance storage of recorded media content data.

In some examples, system 100 may dynamically balance storage of recorded media content data based at least in part on an interaction profile associated with a user. As used herein, an "interaction profile" associated with a user may represent how the user interacts with access subsystem 204 and/or one or more media content instances presented by way of access subsystem 204. The interaction profile associated with a user may be dynamically updated by storage management facility 104 as storage management facility 104 detects the occurrence of one or more "interaction events" performed by or otherwise associated with the user. Such interaction events may include viewing or otherwise accessing media content presented by presentation facility 106, directing DVR facility 102 to perform one or more trick play modes while watching or otherwise accessing media content, and/or otherwise interacting with media content presented by presentation facility 106. In this manner, the interaction profile associated with a user may be dynamically updated over time to reflect how the user interacts with access subsystem 204 and/or one or more media content instances presented by way of access subsystem 204.

An interaction profile associated with a user may be maintained by storage management facility 104 in accordance with any suitable heuristic. In some examples, data representative of detected interaction events, timestamps associated with the detected interaction events, and/or any other data associated with the interaction events (e.g., metadata corresponding to media content being presented during an occurrence of the interaction events) may be processed by storage management facility 104 to generate and/or update the interaction profile. It will be recognized that an interaction profile may correspond to a single user of access subsystem 204 or to multiple users of access subsystem 204 as may serve a particular implementation.

In some examples, storage management facility 104 may be configured to select either the local storage device or the network storage device for initial storage of recorded media content data based on an interaction profile associated with a user of access subsystem 204. For example, an interaction profile associated with a user may indicate that the user consistently watches a television program episode included within a particular program series immediately after the episode is recorded. Based on this information, storage management facility 104 may initially store media content data representative of the episodes in the local storage device so that the user may immediately watch the recorded television programs after they are recorded without having to stream recorded media content data representative of the recorded television programs from the network storage device.

Continuing with this example, the interaction profile associated with the user may further indicate that the user typically only watches the recorded episodes once after they are recorded. Based on this information, storage management facility 104 may dynamically shift or off-load the recorded media content data representative of the recorded television programs from the local storage device to the network storage device after the recorded television programs have been viewed by the user. In this manner, storage space within the local storage device may be used to store other recorded media content data.

Other tendencies of the user as indicated by the interaction profile may be used by storage management facility 104 to determine an initial storage location of recorded media content data and/or to subsequently shift the recorded media content data between the local storage device and the network storage device. Such tendencies may include, but are not limited to, one or more deletion tendencies, trick play mode tendencies (e.g., the user may have a tendency to skip to different playback positions within a recorded media content instance), viewing tendencies (e.g., the user may have a tendency to watch recorded media content instances in the evening and/or on a certain day), and/or any other tendency as may serve a particular implementation. To illustrate, the interaction profile may indicate that the user has a tendency to watch recorded media content during a certain time period each day. Storage management facility 104 may be configured to shift or on-load recorded media content data stored within the network storage device to the local storage device prior to the time period. After the user has watched the recorded media content, the recorded media content data representative of the recorded media content may be shifted or off-loaded back to the network storage device.

In some examples, the interaction profile associated with the user may indicate a context in which a request to record a media content instance is generated. For example, the user may select a media content instance for recording from a program guide presented by presentation facility 106 and/or by way of a search tool presented by presentation facility 106. Such context may be used to determine where to initially store recorded media content data representative of the media content instance and how to subsequently shift the recorded media content data between the local storage device and the network storage device.

The interaction profile associated with the user may be used by storage management facility 104 to predict interest of the user in media content instances not yet experienced by the user. In some examples, these media content instances may be automatically recorded by DVR facility 102 and stored in either the local storage device or network storage device as may serve a particular implementation.

Additionally or alternatively, system 100 may dynamically balance storage of recorded media content data based at least in part on a user profile associated with a user. As used herein, a "user profile" associated with a user profile represents one or more personal traits associated with the user that are not already defined within an interaction profile associated with the user. For example, a user profile maintained by storage management facility 104 may include data representative of a user's age, gender, income level, profession, family status, nationality, preferred genre of media content, etc. Such information may be used by storage management facility 104 to select either the local storage device or the network storage device for initial storage of recorded media content data and/or to dynamically shift the recorded media content data between the local storage device and the network storage device.

To illustrate, a sixteen-year-old girl may direct DVR facility 102 to record an episode of a television program titled "Buffy the Vampire Slayer." Storage management facility 104 may utilize information indicated in a user profile of the girl to select the local storage device for storage of recorded media content data representative of the episode. Subsequently, storage management facility 104 may detect that another user having a different profile (e.g., the girl's father) has become associated with the access subsystem 204 (e.g., by logging in, etc.). Storage management facility 104 may determine, based on the user profile of the father, that the father probably does not have an interest in "Buffy the Vampire Slayer." Storage management facility 104 may accordingly shift or off-load the recorded media content data representative of the episode from the local storage device to the network storage device while the father is using or otherwise associated with access subsystem 204.

Additionally or alternatively, system 100 may dynamically balance storage of recorded media content data based at least in part on a demand rating of media content. As used herein, a "demand rating" of a media content instance refers to a relative demand of the media content instance compared to other media content instances as explicitly specified by the user and/or as implicitly determined by storage management facility 104 (e.g., by way of a historical analysis of one or more viewing tendencies of the user). For example, a user may give a relatively high rating (e.g., 5/5 stars) to a particular television program series and/or designate the series as a "favorite." Hence, the likelihood that recorded episodes of the series will be watched by the user is relatively high compared to other media content instances that the user may record. Accordingly, storage management facility 104 may select the local storage device for storage of recorded media content data representative of recorded episodes in the series so that the user may have immediate access to the recorded episodes.

Figure 5:
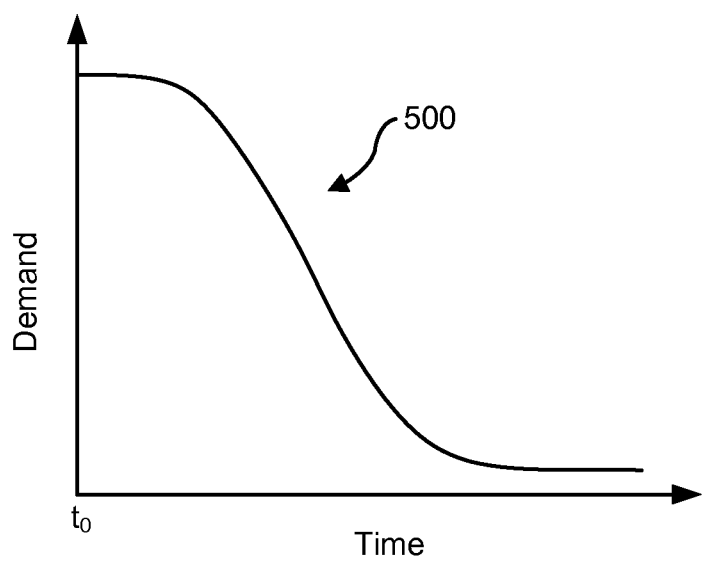
FIG. 5 illustrates an exemplary demand curve that may be associated with a particular media content instance according to principles described herein.

Once recorded media content data representative of recorded media content is initially stored within a local storage device and/or within a network storage device, storage management facility 104 may dynamically shift at least a portion of the recorded media content data between the local storage device and the network storage device in accordance with a "demand curve" associated with the recorded media content. FIG. 5 illustrates an exemplary demand curve 500 that may be associated with a particular media content instance. As illustrated in FIG. 5, demand curve 500 may be representative of how demand for a recorded media content instance wanes as time passes after the media content instance is recorded. For example, the media content instance may be recorded at time $t_0$. As illustrated by demand curve 500, interest in the recorded media content instance is relatively high for a certain time period after the initial recording time. In other words, the user is likely to view or otherwise access the recorded media content instance during this period. However, as time progresses, interest in the recorded media content instance may decrease, as illustrated by demand curve 500. It will be recognized that the rate at which interest in a recorded media content instance decreases and/or any other aspect of demand curve 500 may depend on the particular user, the particular recorded media content instance itself, and/or any other factor as may serve a particular implementation.

Storage management facility 104 may utilize demand curve 500 to determine at what point in time relative to the initial recording time (i.e., time $t_o$) recorded media content data is to be dynamically shifted or off-loaded from the local storage device to the network storage device. In this manner, recorded media content data representative of "stale" (i.e., old or undesirable) media content may be removed from local storage device, thereby freeing storage space within the local storage device for other recorded media content data.

In some examples, demand curve 500 may be affected by subsequent recordings of related media content instances. For example, demand curve 500 may correspond to a first episode within a television series. Storage management facility 104 may detect that subsequent episodes within the series are also recorded. If these subsequent episodes are watched by the user before the first episode is watched, the likelihood that the user will watch the first episode may decrease. This information may be used to formulate demand curve 500 and/or otherwise influence dynamic shifting of recorded media content data between the local storage device and the network storage device.

Storage management facility 104 may additionally or alternatively consider a replay value of a recorded media content instance when determining when or if recorded media content data is to be shifted from the local storage device to the network storage device. As used herein, a "replay value" refers to a likelihood that a media content instance will be repeatedly watched or otherwise accessed. For example, a children's television program (e.g., "SpongeBob") may be watched over and over again by a child and may therefore be kept within the local storage device until storage management facility 104 detects that the child is no longer interested in the program. When this detection is made, storage management facility 104 may dynamically shift or off-load recorded media content data representative of the television program from the local storage device to the network storage device in order to free storage space in the local storage device for other recorded media content data. Other factors that may contribute to a replay value of a recorded media content instance may include, but are not limited to, popularity indicators, user input designations (e.g., the user may mark a specific media content instance as being "saved"), etc.

Additionally or alternatively, system 100 may dynamically balance storage of recorded media content data based at least in part on an available amount of storage capacity of the local storage device. For example, storage management facility 104 may determine that a relatively small amount of storage capacity remains within the local storage device. Storage management facility 104 may therefore select the network storage device for initial storage of recorded media content data and/or dynamically shift at least a portion of recorded media content data stored on the local storage device to the network storage device.

Additionally or alternatively, system 100 may utilize a hardware profile of a media content access device (e.g., media content access device 300) associated with the local storage device to dynamically balance storage of recorded media content data. For example, storage management facility 104 may determine that the media content access device has a relatively high bandwidth network connection, which may enable relatively seamless streaming by the media content access device of recorded media content data stored on a network storage device. Storage management facility 104 may utilize this information to initially store and/or shift recorded media content data to the network storage device.

Additionally or alternatively, system 100 may dynamically balance storage of recorded media content data based at least in part on one or more characteristics of the media content represented by the media content data. Such characteristics may include, but are not limited to, a resolution of the media content (e.g., standard definition ("SD"), high definition ("HD"), etc.), a rating of the media content (e.g., an MPAA rating, a critic's rating, etc.), a genre of the media content, a type of the media content (e.g., video-on-demand content, broadcast television content, live content, tape delayed content, pay-per-view content, etc.), and/or any other characteristic as may serve a particular implementation.

To illustrate, storage management facility 104 may determine that media content designated for recording has an HD resolution. HD media content is typically more bandwidth intensive than its SD counterpart and may take more time to access if stored on a network storage device as opposed to a local storage device. Hence, storage management facility 104 may select the local storage device for storage of the HD media content so that the user does not have to experience any possible delays that may occur in streaming the HD media content from the network storage device.

As another example, storage management facility 104 may determine that media content designated for recording includes video-on-demand content. Because video-on-demand content is typically already stored within a network storage device (included within a video-on-demand server, for example), storage management facility 104 may simply store data within the local storage device that is representative of a pointer to the storage location of the video-on-demand content on the network storage device. If the video-on-demand content is to be deleted by the content provider, for example, storage management facility 104 may dynamically store the actual video-on-demand content within the local storage device and/or update the pointer to point to an alternative storage location.

Additionally or alternatively, system 100 may dynamically balance storage of recorded media content data based at least in part on one or more business rules associated with the media content represented by the media content data. The one or more business rules may be established by a provider of the media content, a service provider (e.g., a subscription television service provider), and/or any other entity as may serve a particular implementation. For example, a media content provider may specify an expiration date after which recorded media content is automatically deleted, one or more rules specifying a particular storage device (e.g., a network storage device) in which the recorded media content data has to be stored, and/or any other rule as may serve a particular implementation.

Additionally or alternatively, system 100 may dynamically balance storage of recorded media content data based at least in part on a time of day and/or a network activity level. For example, storage management facility 104 may initially store recorded media content in the network storage device if network activity is above a certain predetermined threshold and/or if the media content data is recorded during "peak hours" (e.g., during the day). Storage management facility 104 may then dynamically shift or on-load at least a portion of the recorded media content to the local storage device when the network activity is below the predetermined threshold and/or during off-peak hours (e.g., during the night).

In some examples, the selection of at least one storage device from a local storage device and a network storage device for initial storage of recorded media content data and/or the dynamically shifting of the media content data between the local storage device and the network storage device may be performed transparently to the user. In other words, the actions may be performed without the user realizing or being advised of where recorded media content data is stored. In this manner, the user does not have to worry about the local storage device ever running out of available storage space.

Additionally or alternatively, the initial storage and subsequent shifting of recorded media content data may be performed in response to user input. For example, presentation facility 106 may present a storage management graphical user interface by which the user may select one or more options related to the initial storage and subsequent shifting of recorded media content data. For example, the user may specify a preferred initial storage device (e.g., the local storage device) and one or more rules governing the dynamic shifting of recorded media content data between the local storage device and the network storage device.

In some examples, recorded media content data representative of a media content instance may be concurrently stored within both the local storage device and the network storage device. For example, storage management facility 104 may be configured to initially store recorded media content data representative of a media content instance within the local storage device and subsequently store a copy of the recorded media content data within the network storage device. Such concurrent storage may be performed for backup purposes and/or for any other reason as may serve a particular implementation.

Alternatively, a first portion of recorded media content data representative of a media content instance may be stored with the local storage device and a second portion of the recorded media content data may be stored within the network storage device. The first portion may be representative of a beginning portion of the recorded media content instance, for example, and may be stored within the local storage device so that the user may begin watching or otherwise accessing the recorded media content instance immediately without having to wait for the recorded media content data to begin streaming from the network storage device. As the user continues watching the recorded media content instance, the second portion of the recorded media content data stored within the network storage device may be dynamically on-loaded onto the local storage device for presentation to the user. Alternatively, the second portion of the recorded media content data may be streamed directly from the network storage device.

In some examples, the local storage device may be used by storage management facility 104 as a temporary cache for at least a portion of the recorded media content data before the recorded media content data is entirely stored within the network storage device. In this manner, a burst mode and/or other bandwidth optimization technique may be utilized in order to increase the speed at which a media content instance may be recorded.

It will be recognized that system 100 may dynamically balance storage of recorded media content data based on any combination or sub-combination of any of the storage balancing factors described herein. In some examples, each of the storage balancing factors may be weighted in order to assign various levels of importance to the balancing factors. For example, a storage capacity of the local storage device and an interaction profile associated with a user may both be weighted and considered by storage management facility 104 when selecting an initial storage location for recorded media content and/or when dynamically shifting the recorded media content between the local storage device and the network device.

It will be recognized that in each of the examples given herein, the recorded media content data may be accessed by a user regardless of its storage location. Recorded media content data stored within the network storage device, for example, may be streamed to a media content access device (e.g., media content access device 300) for presentation to the user. The streaming may be seamless (i.e., unnoticeable to the user) depending on the amount of available bandwidth and the processing capabilities of the access device.

Figure 6:
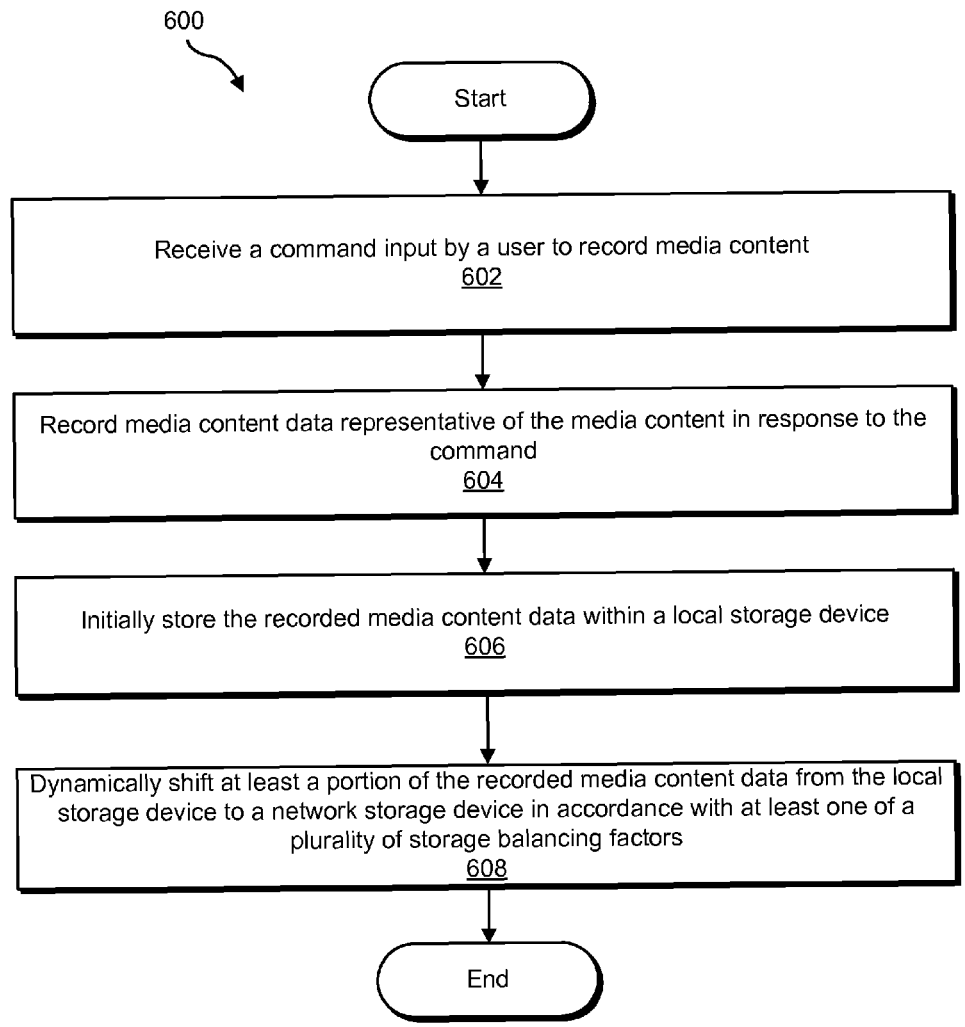
FIG. 6 illustrates another exemplary method of dynamically balancing storage of recorded media content data between a local storage device and a network storage device according to principles described herein.

FIG. 6 illustrates another exemplary method 600 of dynamically balancing storage of recorded media content data between a local storage device and a network storage device. While FIG. 6 illustrates exemplary steps according to one embodiment, other embodiments may omit, add to, reorder, and/or modify any of the steps shown in FIG. 6. The steps shown in FIG. 6 may be performed by any component or combination of components of system 100. In particular, the steps shown in FIG. 6 may be performed by a media content access device (e.g., media content access device 300) in certain embodiments.

In step 602, a command input by a user to record media content is received. The command may be received in any of the ways described herein.

In step 604, media content data representative of the media content is recorded in response to a command input in step 602. The media content data may be recorded in any of the ways described herein.

In step 606, the recorded media content data is initially stored within a local storage device. The local storage device may be included within or otherwise associated with the media content access device.

In step 608, at least a portion of the recorded media content data is dynamically shifted from the local storage device to a network storage device in accordance with at least one of a plurality of storage balancing factors. The dynamic shifting may be performed in any of the ways described herein.

Figure 7:
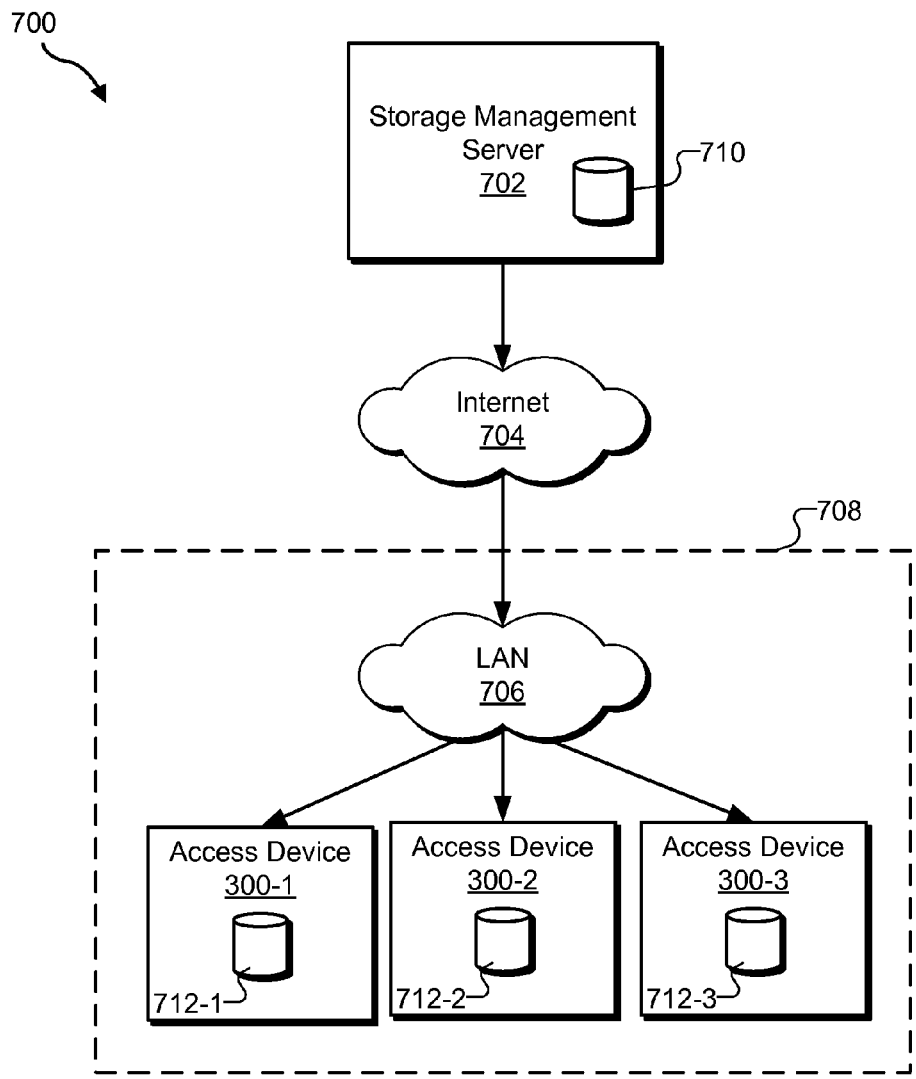
FIG. 7 illustrates an exemplary configuration in which a storage management server is configured to communicate with a plurality of access devices according to principles described herein.

A specific implementation of the systems and methods described herein will now be described in connection with FIG. 7. FIG. 7 illustrates an exemplary configuration 700 in which a storage management server 702 is configured to communicate with a plurality of access devices 300 (e.g., access devices 300-1 through 300-3) by way of the Internet 704 and a local area network 706. As shown, each of the access devices 300 may be located within a user premises 708 (e.g., a home of a user). Access devices 300 may be communicatively coupled by way of local area network 706 and may each include any of the access devices described herein. For example, access devices 300-1 and 300-2 may include set-top box devices and access device 300-3 may include a personal computer.

As shown in FIG. 7, a network storage device 710 may be associated with (e.g., included within) storage management server 702. Storage devices 712-1 through 712-3 may be associated with (e.g., included within) access devices 300-1 through 300-3, respectively.

Any of facilities 102-108 may be implemented by storage management server 702 and/or one or more of access devices 300. For example, DVR facility 102 may be implemented by one or more of access devices 300, storage management facility 104 may be implemented by storage management server 702 and/or one or more of access devices 300, presentation facility 106 may be implemented by one or more of access devices 300, and storage facility 108 may be implemented by storage management server 702 and/or one or more of access devices 300.

In some examples, any of storage devices 712 may be selectively designated as a network storage device. For example, from the perspective of access device 300-1, storage device 712-1 may be considered to be a local storage device while storage devices 712-2 and 712-3 may be considered to be network storage devices. Hence, access device 300-1 may selectively store recorded media content data in local storage device 712-1 and/or any of network storage devices 712-2, 712-3, and 710.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on a non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 8:
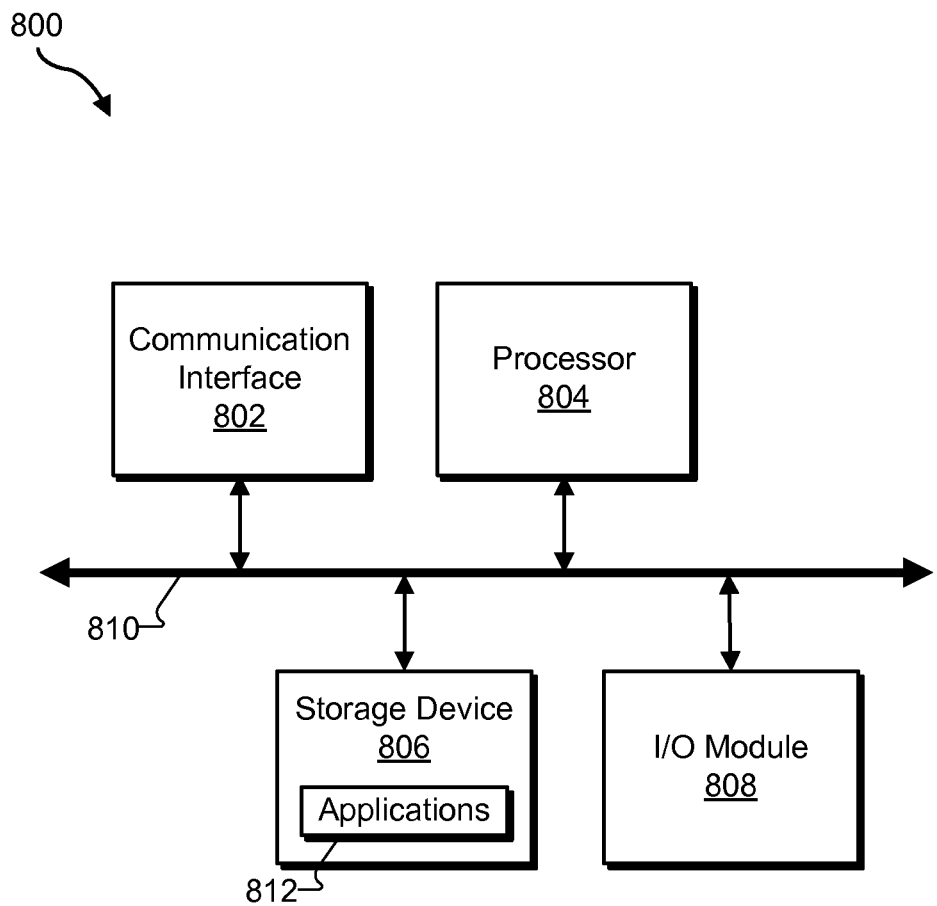
FIG. 8 illustrates an exemplary computing device according to principles described herein.

FIG. 8 illustrates an exemplary computing device 800 that may be configured to perform one or more of the processes described herein. As shown in FIG. 8, computing device 800 may include a communication interface 802, a processor 804, a storage device 806, and an input/output ("I/O") module 808 communicatively connected via a communication infrastructure 810. While an exemplary computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, and any other suitable interface. Communication interface 802 may additionally or alternatively provide such a connection through, for example, a local area network (such as an Ethernet network), a personal area network, a telephone or cable network, a satellite data connection, a dedicated URL, or any other suitable connection. Communication interface 802 may be configured to interface with any suitable communication media, protocols, and formats, including any of those mentioned above.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another non-transitory computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 806. For example, data representative of one or more executable applications 812 (which may include, but are not limited to, one or more of the software applications described herein) configured to direct processor 804 to perform any of the operations described herein may be stored within storage device 806. In some examples, data may be arranged in one or more databases residing within storage device 806.

I/O module 808 may be configured to receive user input and provide user output and may include any hardware, firmware, software, or combination thereof supportive of input and output capabilities. For example, I/O module 808 may include hardware and/or software for capturing user input, including, but not limited to, a keyboard or keypad, a touch screen component (e.g., touch screen display), a receiver (e.g., an RF or infrared receiver), and/or one or more input buttons.

I/O module 808 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with DVR facility 102, storage management facility 104, and/or presentation facility 106. Likewise, storage facility 108 may be implemented by or within storage device 806.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow.

For example, certain features of one embodiment described herein may be combined with or substituted for features of another embodiment described herein. The description and drawings are accordingly to be regarded in an illustrative rather than a restrictive sense.

What is claimed is:

1. A method comprising:
   receiving, by a media content storage balancing system, a command input by a user to record media content;
   recording, by the media content storage balancing system, media content data comprising at least a portion of an episode of a television series in response to the command;
   automatically selecting, by the media content storage balancing system, at least one storage device from a local storage device and a network storage device for storage of the recorded media content data in accordance with a demand rating that represents a relative demand for the recorded media content compared to at least one other media content instance and is determined based at least in part on the user consistently watching episodes of the television series within a certain time period after the episodes are recorded, wherein:
      the local storage device is included within a media content access device capable of facilitating presentation of the media content data, and
      the network storage device is included within a remote server communicatively connected to the media content access device by way of a wide area network; and
   storing, by the media content storage balancing system, the recorded media content data in the at least one selected storage device.

2. The method of claim 1, further comprising dynamically shifting, by the media content storage balancing system after the storing, at least a portion of the recorded media content data between the local storage device and the network storage device in accordance with at least one of a plurality of storage balancing factors.

3. The method of claim 2, wherein the dynamic shifting is performed transparently to the user.

4. The method of claim 2, wherein the dynamically shifting comprises on-loading the at least a portion of the recorded media content data from the network storage device to the local storage device in anticipation of a presentation of the recorded media content to the user.

5. The method of claim 2, wherein the dynamically shifting comprises off-loading the at least a portion of the recorded media content data from the local storage device to the network storage device.

6. The method of claim 2, wherein the at least one of the plurality of storage balancing factors comprises at least one of an interaction profile associated with the user, a user profile associated with the user, the demand rating that represents the relative demand for the recorded media content, a demand curve associated with the recorded media content, a replay value of the recorded media content, a storage capacity of the local storage device, a hardware profile of a media content access device associated with the local storage device, a characteristic of the recorded media content, a business rule associated with the recorded media content, a time of day, and a network activity level.

7. The method of claim 1, further comprising:
   presenting, by the media content storage balancing system, the recorded media content to the user; and
   dynamically shifting, by the media content storage balancing system after the presentation, at least a portion of the recorded media content data between the local storage device and the network storage device in accordance with at least one of a plurality of storage balancing factors.

8. The method of claim 1, wherein the automatically selecting comprises selecting the network storage device for storage of the recorded media content data and wherein the storing comprises using the local storage device as a temporary cache for at least a portion of the recorded media content data before the recorded media content data is entirely stored within the network storage device.

9. The method of claim 1, wherein the selecting is performed transparently to the user.

10. The method of claim 1, wherein the wide area network comprises an Internet.

11. The method of claim 1, embodied as computer-executable instructions on at least one non-transitory computer-readable medium.

12. The method of claim 1, wherein the demand rating comprises an indication of whether the user is relatively likely to watch the recorded media content compared to the at least one other media content instance.

13. The method of claim 1, wherein
the demand rating indicates that the user consistently watches episodes of the television series shortly after being recorded.

14. The method of claim 1, wherein:
the automatically selecting comprises automatically selecting the local storage device for storage of the recorded media content in accordance with the demand rating; and
the storing comprises storing the recorded media content in the local storage device such that the user is able to immediately watch the recorded media content without having to stream the recorded media content from the network storage device.

15. A method comprising:
receiving, by a media content access device, a command input by a user to record media content;
recording, by the media content access device, media content data comprising at least a portion of an episode of a television series in response to the command;
initially storing, by the media content access device, the recorded media content data within a local storage device included within the media content access device; and
dynamically shifting, by the media content access device after the initial storing, at least a portion of the recorded media content data from the local storage device to a network storage device included within a remote server communicatively connected to the media content access device by way of a wide area network in accordance with a demand rating that represents a relative demand for the recorded media content compared to at least one other media content instance and is determined based at least in part on the user consistently watching episodes of the television series within a certain time period after the episodes are recorded.

16. The method of claim 15, further comprising:
presenting, by the media content storage balancing system, the recorded media content to the user; and
dynamically shifting, by the media content storage balancing system after the presentation, at least a portion of the recorded media content data between the local storage device and the network storage device in accordance with at least one of a plurality of storage balancing factors.

17. A system comprising:
a digital video recording facility configured to
receive a command input by a user to record media content, and
record media content data comprising at least a portion of an episode of a television series in response to the command; and
a storage management facility communicatively coupled to the digital video recording facility and configured to
automatically select at least one storage device from a local storage device and a network storage device for storage of the recorded media content data in accordance with a demand rating that represents a relative demand for the recorded media content compared to at least one other media content instance and is determined based at least in part on the user consistently watching episodes of the television series within a certain time period after the episodes are recorded, wherein
the local storage device is included within a media content access device capable of facilitating presentation of the media content data, and
the network storage device is included within a remote server communicatively connected to the media content access device by way of a wide area network, and
store the recorded media content data in the at least one selected storage device.

18. The system of claim 17, wherein the storage management facility is further configured to dynamically shift at least a portion of the recorded media content data between the local storage device and the network storage device in accordance with at least one of a plurality of storage balancing factors.

19. The system of claim 18, wherein the storage management facility is configured to perform the dynamic shifting in a manner that is transparent to the user.

20. The system of claim 18, wherein the at least one of the plurality of storage balancing factors comprises at least one of an interaction profile associated with the user, a user profile associated with the user, the demand rating that represents the relative demand for the recorded media content, a demand curve associated with the recorded media content, a replay value of the recorded media content, a storage capacity of the local storage device, a hardware profile of a media content access device associated with the local storage device, a characteristic of the recorded media content, a business rule associated with the recorded media content, a time of day, and a network activity level.

21. The system of claim 17, wherein the storage management facility is configured to perform the automatic selection in a manner that is transparent to the user.

* * * * *